INVENTORS.
GUS W. WALLIN
JOHN W. BESSENT
BY
Bertha L. MacGregor
ATTORNEY

United States Patent Office 3,426,261
Patented Feb. 4, 1969

3,426,261
CONVERTIBLE POWER MIXER AND
OTHER APPLIANCES
Gus W. Wallin, Chicago, Ill., and John W. Bessent, Wauwatosa, Wis., assignors to Scovill Manufacturing Company, Waterbury, Conn., a corporation of Connecticut
Filed Sept. 19, 1966, Ser. No. 580,356
U.S. Cl. 318—290    8 Claims
Int. Cl. H02p 1/22, 1/40; H02k 7/10

This invention relates to a convertible power mixer, but may be adapted for embodiment in other convertible power appliances and devices, particularly those which employ a rotated motor shaft which operates over a wide range of speeds for imparting motion to working parts of such appliances and devices.

"Convertible power" as used herein means the power derived from batteries usually mounted in or in close proximity to the device to be operated as well as from external high voltage AC current supplying power lines or storage batteries of different voltages, i.e., conventional 12-volt automobile batteries, 24-volt aircraft batteries, and other. The high voltage power may be AC rectified or DC-battery derived. The number and size of batteries employed for providing the external power source may vary. The power operated devices referred to in this application may include any device, tool or appliance optionally powered by either batteries or other electrical current source.

Reference is made to the co-pending application for patent of Gus W. Wallin, U.S. Ser. No. 537,918, filed Mar. 28, 1966, wherein a number of electrical circuits suitable for embodiment in power operated knives and other devices have been shown. As explained in said application, the main object of the invention was to produce an efficient convertible power device which may be operated interchangeably by battery power or by connection to an external power source without the use of a step-down transformer.

The main object of this invention is to produce an efficient food mixer and other devices which may be operated interchangeably by battery power or by connection to an external power source, without the use of a step-down transformer, and which are provided with means for conserving battery power and avoiding excessive battery drain which would result in too short an operating time.

Another object is to produce a motor for such appliances designed to operate on a low voltage battery supply and also on conventional 120-volt supply at high efficiency over its entire operating speed range of 4,000 to 14,000 r.p.m.

It is customary, in conventional food mixers operated by high voltage AC current, to employ a fan coupled to the motor shaft for cooling the motor. There is no need for a fan when the mixer is operated from a low voltage battery source. The fan adds as much as an additional 14-watts load to the battery when using the mixer at its higher speed range. It is essential to conserve battery power and to avoid excessive battery drain which would result in too short an operating time. To achieve these objects the food mixer shown herein has been provided with fan de-clutching means. The fan is coupled to the motor shaft in such manner as to drive the fan when the motor is operated on the high voltage AC current and to permit the fan to idle on the shaft when driven by low voltage such as 4.8 volts DC battery derived current. Automatic de-clutching of the fan is accomplished by the mechanism described herein in response to reversal of the direction of the motor shaft when switching fromt he high voltage AC current input to the low voltage DC current.

The operation of the food mixer of this invention on a low voltage battery supply and also on conventional high voltage AC current supply at high efficiency over its entire operation speed range of 4,000 to 14,000 r.p.m. is achieved by the use of a wound field series dual voltage motor. A permanent magnet dual voltage motor develops very high efficiency, but only over a limited speed range. A PM motor designed for a maximum speed of 14,000 r.p.m. will be less than 25 percent efficient when operated at 4,000 r.p.m. This means short battery life on battery operation and excessive temperatures on 120-volt operation. The wound field series dual voltage motor employed in the mixer of this invention overcomes these disadvantages. Peak efficiency of a wound field series motor is not as high as a PM motor, but it maintains high efficiency over a wide speed range.

This invention will be shown and described as embodied in a food mixer provided with a centrifugal speed governor of the kind shown in the Seyfried et al. U.S. Patent No. 3,013,133 dated Dec. 12, 1961, assigned to the assignee of this application.

The objects and advantages of the invention will be apparent from the drawings and following description.

Figure 1:
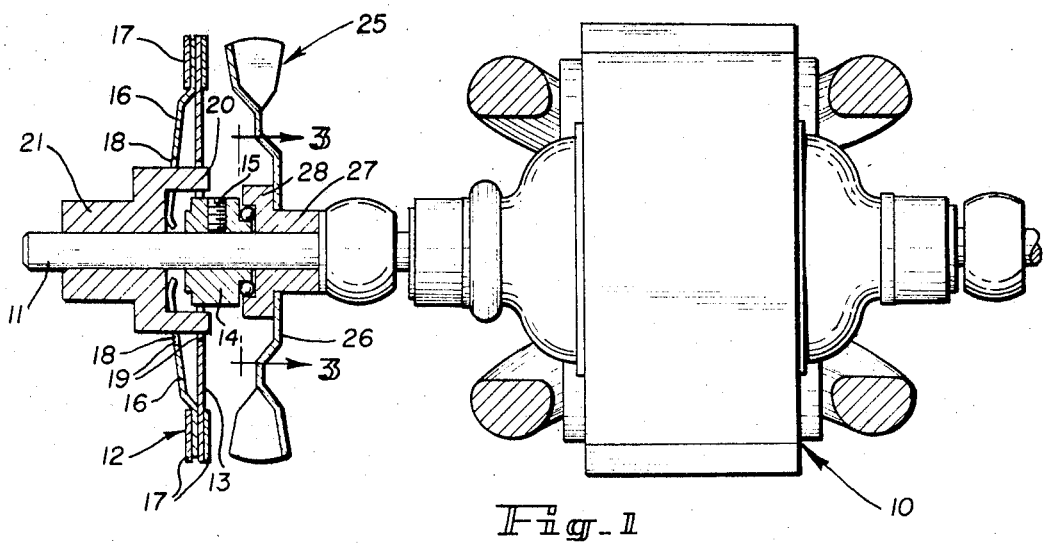
FIG. 1 is a longitudinal vertical sectional view, partly in elevation, of part of a food mixer embodying our invention, the battery pack and part of the speed control means having been omitted.
Figure 2:
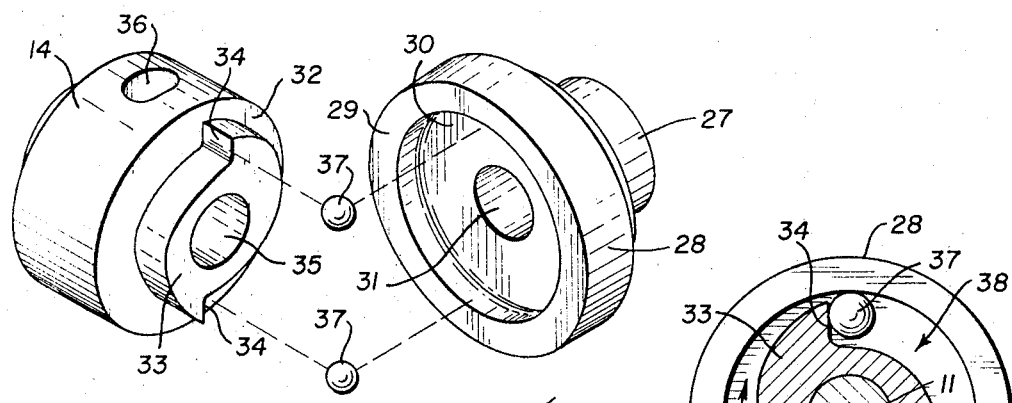
FIG. 2 is an exploded perspective view showing the parts which constitute the means for mounting the fan on the motor shaft.

In that embodiment of the invention shown in the drawings, a wound field series dual voltage motor 10 drives the motor shaft 11. The motor may be powered, interchangeably, by a high voltage AC external power source or by low voltage such as 4.8 volts DC current derived from batteries (not shown) mounted in the mixer housing (not shown) or other appliance or device.

The centrifugal governor 12 comprises a speed responsive member which includes a flat perforated spring steel plate 13 having a central opening therein. The resilient plate 13 is firmly attached to a hub 14. The hub 14 is fixed on the motor shaft 11 by set screw 15 to rotate with the shaft. The speed responsive member also includes two identical speed responsive blades 16, each attached at one end to resilient plate 13. Backing plates 17 which serve as weights are attached to the blades 16 and plate 13 adjacent their radial outer ends by any suitable means which also connect the blades 16 and plate 13 together, leaving the inner ends of the blades 16 free. Said free ends are provided with concavely curved edges 18 to accommodate the motor shaft 11. The plate 13 and blades 16 have slots 19 for the reception of the projections 20 on a slider 21.

The slider 21 is loosely mounted on the shaft 11, and moves on the shaft in response to the movement imparted to the blades 16 by centrifugal force. The operation of the speed control governor 12 is explained in said U.S. Patent No. 3,013,133, and as there stated, the slider 21 may cooperate with various kinds of switch mechanisms (not shown here) which control the mixer speeds.

A fan 25 comprises a plurality of fan blades 26 fixed on the smaller diameter part 27 of a hub 28. The hub 28 is loosely mounted on the shaft 11. The face 29 of the shaft 28 is provided with a concentric recess 30, and both parts 27, 28 have a central opening 31 for reception of the motor shaft. The hub 28 cooperates with the hub 14 on which the speed control governor plate 13 is mounted, as will be explained hereinafter.

Figure 3:
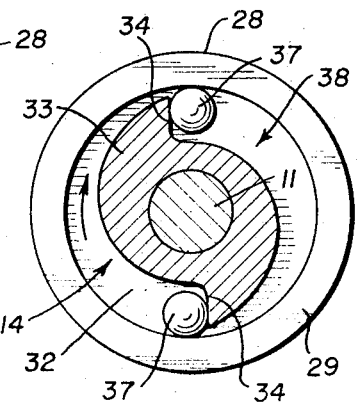
FIG. 3 is a transverse vertical sectional view in the plane of the line 3—3 of FIG. 1, showing the fan mounting means in their declutched positions wherein the fan hub is idle on the shaft.

The hub 14 has a face 32 from which projects an eccentric clutch 33 with ball engaging members 34. The hub 14 and clutch 33 are provided with a central opening 35 for reception of the motor shaft 11, and the hub has a threaded bore 36 for the set screw 15 which fastens the hub on the shaft 11. The clutch 33 extends into the recess 30 in the fan hub 28 when the hubs 14 and 28 are mounted on the shaft 11 and the faces 32 and 29 abut each other. The balls 37 are located in the spaces 38 between the clutch 33 and the hub 29, at opposite sides of the shaft 11. When the shaft is rotated clockwise, as shown in FIG. 3, the clutch surfaces 34 engage the balls 37 and carry them loosely in the widest portion of the space 38, without driving engagement between the balls and the inner concentric wall of the hub 28 which defines the recess 30. Thus, when the shaft 11 and hub 14 are rotated clockwise, the fan hub 28 is declutched and idles on the shaft 11. This is the condition desired for low voltage operation of the motor, when its power is derived from low voltage batteries (not shown), and cooling of the motor is not necessary.

Figure 4:
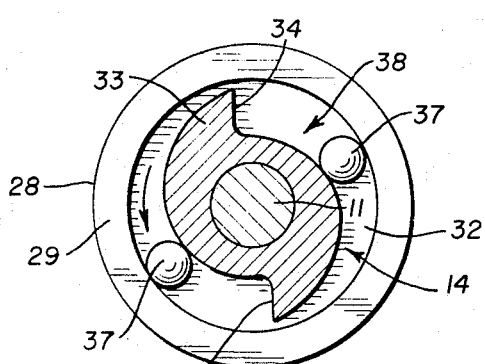
FIG. 4 is a view similar to FIG. 3 showing the fan mounting means in their clutched positions wherein the fan is rotated with the motor shaft.

When the shaft 11 is rotated counterclockwise, as shown in FIG. 4 the clutch 33 on hub 14 also rotates counterclockwise, and then the balls 37 occupy the narrow parts of the spaces 38 and are forced into driving contact with the concentric wall of the hub 28 which defines the recess 30. Thus, when the shaft 11 and hub 14 are rotated counterclockwise, the fan hub 28 is clutched to the hub 14 and the fan is driven to rotate with the shaft 11. This is the condition desired for high voltage operation of the motor, when its power is derived from a high voltage external source, and cooling of the motor is required.

Figure 5:
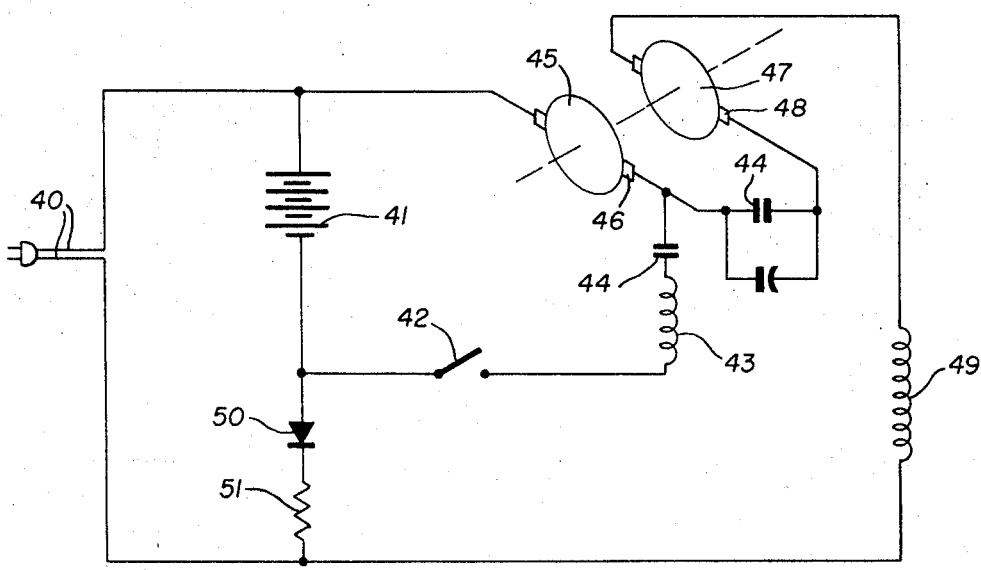
FIG. 5 is a diagram of the electrical circuit employed in this invention.

FIG. 5 shows the wiring diagram. The unit is wired so that the direction of rotation will reverse when changed from 120-volt AC to 4.8-volt DC battery-operation. This arrangement makes it possible to employ the slip-clutch mechanism described for rendering the fan inoperative when not needed, as is the case when the low voltage DC battery derived power is used. In the diagram, the 120-volt external power source leads are designated 40, a battery or battery pack 41, cord switch 42 which is open when the plug is connected to the power source, low voltage field winding 43, speed governor contacts 44, low voltage armature winding 45, commutator 46 connected to the low voltage armature winding, high voltage armature winding 47, commutator 48 connected to the high voltage armature winding, and high voltage field winding 49, connected as shown. A half wave rectifier 50 and battery charging resistor 51 are connected in the line. A .08 mfd. capacitor is connected in parallel to the governor contacts.

The low voltage winding 45 consists of eight coils, wound with ten turns per coil of No. 23 wire. The high voltage winding 47 consists of sixteen coils, wound with sixty turns per coil of No. 34 wire. The field is also wound with two separate windings. The low voltage field winding consists of two coils wound with twenty turns per coil of No. 18 wire, and the high voltage field winding consists of two coils wound with one hundred eighty turns per coil of No. 29 wire.

Figure 6:
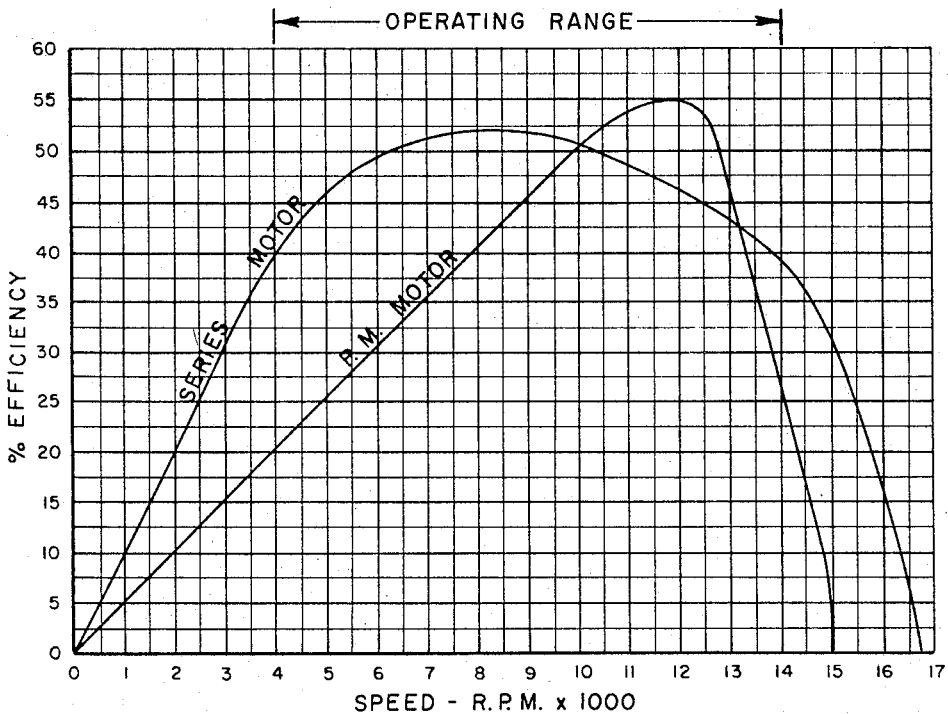
FIG. 6 is a chart showing the relative efficiency and operating ranges of a wound field series dual voltage motor and a permanent magnet motor.

The motor 11, constructed as described, maintains high efficiency over a wide speed range as illustrated in the chart, FIG. 6. While a permanent magnet motor has peak efficiency higher than the wound field series motor, the PM motor is efficient over only a limited speed range, whereas the wound field series motor maintains its efficiency over a wide speed range of 4000 to 14,000 r.p.m.

In describing the invention, reference has been made to a particular example embodying the same, but we wish it to be understood that the invention is not limited to the construction shown in the drawing and that various changes may be made in the construction and general arrangement of parts without departing from the invention as defined by the appended claims.

We claim:

1. A food mixer or other motor driven mechanism which derives its power from a high voltage source or a low voltage source, comprising
   (a) a housing,
   (b) a motor having a rotated shraft in the housing,
   (c) an electrical circuit interchangeably connecting the motor to a high voltage source or a low voltage source,
   (d) means in the circuit for reversing the direction of rotation of the motor shaft when the motor is changed from high to low voltage operation or from low to high voltage operation,
   (e) a motor ventilating fan on the motor shaft, and
   (f) clutch means between the fan and shaft responsive to the reversal of direction of rotation of the motor shaft for clutching the fan to the shaft during operation of the motor on the high voltage source and for declutching the fan and causing the fan to idle on the shaft during operation of the motor on the low voltage source.

2. The mechanism defined by claim 1, in which the clutch means between the fan and shaft comprises a clutch hub fixedly mounted on the shaft, an eccentrically shaped clutch member on one face of the hub, an adjacent fan hub loosely mounted on the shaft, and means between the clutch hub and the fan hub imparting rotary motion to the fan hub during rotation of the motor shaft in one direction and causing the fan hub to idle on the shaft during rotation of the motor shaft in the opposite direction.

3. The mechanism defined by claim 1, in which the clutch means between the fan and shaft comprises a clutch hub fixedly mounted on the shaft, an eccentrically shaped clutch member projecting from one face of the fixed hub, an adjacent fan hub loosely mounted on the shaft, said fan hub having a recessed face for receiving the eccentrically shaped clutch member, and bodily movable means between the clutch hub and the recessed face of the fan hub engaging said clutch hub and fan hub for clutching them together and imparting rotary motion to the fan hub during rotation of the motor shaft in one direction and causing the fan hub to idle on the shaft during rotation of the motor shaft in the opposite direction.

4. The mechanism defined by claim 3, which includes a centrifugally influenced speed control device mounted on the clutch hub on the motor shaft.

5. The mechanism defined by claim 3, in which the bodily movable members are a pair of balls located between the eccentrically shaped clutch member of the clutch hub and the peripheral wall of the recessed face of the fan hub at opposite sides of the motor shaft.

6. The mechanism defined by claim 1, in which the motor is a wound field series dual voltage motor, and the electrical circuit includes a low voltage armature winding, a commutator connected to the low voltage armature winding, a high voltage armature winding, a commutator connected to the high voltage armature winding, a low voltage field winding, a high voltage field winding, a capacitor, a rectifier and a charging resistor.

7. The mechanism defined by claim 6, in which the high voltage armature winding consists approximately of 16 coils wound with 60 turns per coil of No. 34 wire, and the low voltage armature winding consists approximately of 8 coils wound with 10 turns per coil of No. 23 wire.

8. The mechanism defined by claim 6, in which the high voltage field winding consists of two coils wound with approximately 180 turns per coil of No. 29 wire and the low voltage field winding consists of two coils wound with approximately 20 turns per coil of No. 18 wire.

References Cited

UNITED STATES PATENTS

| | | | |
|---|---|---|---|
| 2,398,261 | 4/1946 | Stone | 192—45 |
| 2,670,449 | 2/1954 | Brice | 310—78 X |
| 2,677,798 | 5/1954 | Bekey | 318—495 |

ORIS L. RADER, *Primary Examiner.*

T. L. CROSSON, *Assistant Examiner.*

U.S. Cl. X.R.

310—78; 318—441, 442, 500